United States Patent
Fujii et al.

[11] Patent Number: 5,940,499
[45] Date of Patent: Aug. 17, 1999

[54] VOICE SWITCH USED IN HANDS-FREE COMMUNICATIONS SYSTEM

[75] Inventors: Kensaku Fujii; Juro Ohga; Hiroyuki Masuda, all of Kawasaki, Japan

[73] Assignee: Fujitsu Limited, Kawasaki, Japan

[21] Appl. No.: 08/778,194

[22] Filed: Jan. 2, 1997

Related U.S. Application Data

[63] Continuation of application No. 08/630,839, Apr. 10, 1996, abandoned, and a continuation of application No. 08/420,711, Apr. 11, 1995, abandoned, and a continuation of application No. 08/105,190, Aug. 12, 1993, abandoned.

[30] Foreign Application Priority Data

Aug. 25, 1992 [JP] Japan ................................ 4-225706

[51] Int. Cl.⁶ .................................................. H04M 1/00
[52] U.S. Cl. ........................... 379/389; 379/390; 379/392; 379/420
[58] Field of Search ..................................... 379/390, 388, 379/387, 389, 406, 410, 411, 420, 392

[56] References Cited

U.S. PATENT DOCUMENTS

| | | | |
|---|---|---|---|
| 4,764,954 | 8/1988 | Tsurusaki et al. | 379/390 |
| 5,075,687 | 12/1991 | Chen et al. | 379/390 X |
| 5,187,741 | 2/1993 | Erving et al. | 379/390 X |
| 5,357,567 | 10/1994 | Barron et al. | 379/390 |

FOREIGN PATENT DOCUMENTS 2-309851  12/1990  Japan .

*Primary Examiner*—Scott Wolinsky
*Attorney, Agent, or Firm*—Staas & Halsey

[57] ABSTRACT

A voice switch in a hands-free communications system performs selective attenuation with respect to respective voice signals being transmitted and received in respective transmitting and receiving paths, the transmitted voice signal having been converted from an audible voice by a microphone connected to the transmitting path and the received voice signal having been converted by a loudspeaker to an audible voice output. A detector selectively detects a currently transmitted voice signal at a normal level, a currently received voice signal at a normal level, and drops in the respective levels thereof to nil levels and provides corresponding outputs to a controller. When one of the transmitted and received voice signals is of a normal level and the detector newly detects the other thereof at a normal level, the controller selectively attenuates that other, newly-detected normal level voice signal. Further, when a current voice signal of a normal level drops to a nil level and, within a selected time interval, resumes its normal level and also the other voice signal is newly detected at a normal level, the controller preferentially attenuates the newly detected voice signal such that the resumed normal level voice signal is preferentially processed.

25 Claims, 12 Drawing Sheets

VOICE SWITCH USED IN HANDS-FREE COMMUNICATIONS SYSTEM

This application is a continuation of application Ser. No. 08/630,839, filed on Apr. 10, 1996, now abandoned, which is a continuation of application Ser. No. 08/420,711, filed Apr. 11, 1995, now abandoned, which is a continuation of application Ser. No. 08/105,190, filed on Aug. 12, 1993, now abandoned.

BACKGROUND OF THE INVENTION

The present invention relates to a hands-free system which makes it possible to communicate without using a handset and which makes it possible to use a speaker and a microphone during a communication session; more particularly, the present invention relates to a voice switch used to control howling, which causes a problem in a hands-free system.

A hands-free system provides a function of communicating without using a handset and of allowing a communication session to be carried out by using a speaker and a microphone. The hands-free system is applied to telephones and to teleconference systems. In a hands-free system, it is generally required to provide a means for preventing howling from occurring when a gain of a local loop, formed by acoustic coupling between the speaker and the microphone, exceeds 1.

One of the embodiments of the above-mentioned means is a voice switch. A voice switch compares respective signal powers of a receive speaking circuit and a transmit speaking circuit, and determines that the signal having a greater power is associated with the current speaker, whereupon the voice switch applies a great attenuation to the speaking circuit determined not to be associated with the current speaker. This ensures that the gain of the above-mentioned local loop is below and that howling is prevented from occurring. Since the voice switch always applies a great attenuation to a signal on one of the speaking circuits, the communications provided by the voice switch are invariably one-way communications. Normally, the two parties engaged in a communication session take turns in speaking, so that the one-way communication does not render a conversation impossible. However, a voice switch is required to effect switching at a rate as rapid as possible in order to provide a conversation as smooth as one taking place when a handset is used.

An echo canceller is known as a means for resolving the problem arising from the above one-way communications. However, since it is required to allow a certain amount of convergence time in the echo canceller under variations of the acoustic coupling, it becomes necessary to use the echo canceller and the voice switch jointly in order to prevent howling from occurring due to reduction, during the convergence time, of an echo cancellation amount (rise in the gain of the local loop). That is, even when the echo canceller is introduced in the system, it is in great demand that a voice switch capable of rapidly switching the talking direction be provided in the system in order to achieve a conversation as smooth as one taking place when a handset is used.

FIG. 1 is a block diagram showing a conventional voice switch. The voice switch therein illustrated comprises an attenuator 12 provided in the transmit speaking circuit to which a microphone 10 is connected and an attenuator 16 provided in the receive speaking circuit to which a speaker 18 is connected. Further, the voice switch includes a voice power calculator 14 for calculating a power $P_T$ of a transmitted voice supplied by the microphone 10; a voice power calculator 20 for calculating a power $P_R$ of a received voice, received via a communication line and an attenuation controller 22 for comparing the above-mentioned voice powers $P_T$ and $P_R$ and controlling the attenuators 12 and 16 by making a determination described in the following.

The attenuation controller 22 controls the attenuation in the following manner. When it is found, in comparing the above-mentioned voice powers, that $aP_R \geq P_T$, the attenuation of the attenuator 16 in the receive path is adjusted to be small, and the attenuation of the attenuator 12 in the transmit path is adjusted to be large. When $aP_R < P_T$, the attenuation of the attenuator 12 in the transmit path is adjusted to be small, and the attenuation of the attenuator 16 in the receive path is adjusted to be large. A constant a is determined on the basis of the estimated degree of acoustic coupling.

The problem with the voice switch of FIG. 1 derives from the inability of the switch to differentiate an echo, generated by a received voice which reaches the microphone 10 after reverberating in the room in which the associated communications set is housed, from the transmitted voice. If, due to the echo, it is found, in comparing the powers of the transmitted voice and the received voice, that $aP_R < P_T$, the voice switch selects the transmit speech path, thus causing a receive blocking phenomenon to occur in which a subsequent received voice is blocked till the condition $aP_R \geq P_T$ sets in. (A similar phenomenon caused by the echo of the transmitted voice is called a transmit blocking phenomenon. While the receive blocking phenomenon is taken as an example throughout the description that follows, it is to be noted that the two phenomena are of the same nature). Variations in voice level are fairly large so that it is highly likely that the condition $aP_R < P_T$ occurs.

It is when the received voice level drops to nil that this phenomenon is likely to occur. In such a case, while the received voice level drops to nil and the power $P_R$ becomes small, the echo thereof does not drop to a small level immediately. Therefore, it is very likely that the condition $aP_R < P_T$ sets in.

The occurrence of this phenomenon is countered conventionally, by increasing the constant a, and by increasing the time consonant of a filter employed for calculating the received voice power, so as to become equal to the reverberation time, so that the condition $aP_R < P_T$ will not set in.

However, increasing the time constant of the power calculating filter means increasing a time for which the absence of the received voice, i.e. the mute period, is construed as the time during which the received voice is still being received. Increasing the constant a means increasing the transmitted voice power necessary for the voice switch to select the transmit speech path. Thus, the two arrangements both act to delay the switching of the voice switch to the transmit path, thereby prohibiting smooth switching, as is necessary for a normal conversation in which the parties engaged in the conversation take turns speaking, but without intervals between their respective speech intervals. The value to be assigned to the constant a varies according to the degree of acoustic coupling, thus necessitating that the constant have a relatively large level in anticipation of the largest amount of echo (reverberation) that may be picked up, and thus making it extremely difficult to detect the transmitted voice.

There is proposed in the Japanese Laid-Open Patent 2-309851 a voice switch as shown in FIG. 2 as a solution to the above-mentioned problems. In FIG. 2, those parts that are identical to the parts of FIG. 1 are designated by the same reference numerals from figure to figure. The voice switch shown in FIG. 2 comprises voice detectors (detection units) 24 and 26, a line status determination unit 28 and a line status holding unit 30. A hybrid circuit 32 provides four-wire to two-wire interface between the hands-free system and the communication line.

A voice Level detection circuit 24A of the voice detector 24 detects the transmitted voice level, and a noise level detection circuit 24B detects the delivered from the microphone 10. A comparator 28A of the line status determination unit 28 makes a determination that a voice is delivered when the transmitted voice level is greater than the noise level, thereby selecting the transmitted voice level as an output therefrom. Otherwise, the comparator 28A determines that no voice is delivered and outputs zero. Similarly, a voice level detection circuit 26A of the voice detector 26 detects the received voice level, and a noise level detecting circuit 26B detects the level of a noise delivered via the communication line. A comparator 28B of the line status determination unit 28 selects the received voice level as an output therefrom when the received voice level is greater than the noise level. Otherwise, the comparator 28B outputs zero.

A comparator 30A of the line status holding circuit 30 compares the transmitted voice level from the comparator 28A and the received voice level from the comparator 28B, and operates in accordance with the rules set forth below:

(1) Provide a great attenuation to a signal on the receive speech path and a small attenuation to a signal on the transmit speech path in case only the transmitted voice is detected.

(2) Provide a great attenuation to a signal on the transmit speech path and a small attenuation to a signal on the receive speech path in case only the received voice is detected.

(3) Hold the line status as it is, irrespective of which of the voice levels is greater, in case both the transmitted voice and the received voice are detected.

(4) Hold the line status as it is in case no voice is delivered on either the transmit speech path or the receive speech path.

The above-described results are registered in a register 30B, the attenuators 12 and 16 being controlled on the basis thereof.

Thus, even when the received voice output from the speaker 18 reverberates and this reverberation is interpreted as the transmitted voice, the above-mentioned rule (3) enables the voice switch to continue to select the receive speech path as long as the received voice continues to be detected. In this way, the aforementioned problem of the conventional method, namely a failure to provide correct attenuation due to variations in voice levels, is eliminated.

However, a problem arises with the conventional voice switch as shown in FIG. 2 when the received voice level drops to nil. That is, when the received voice level drops to nil, the reverberation (echo) is interpreted as the transmitted voice, and the voice switch is switched to the transmit speech path. Consequently, the voice switch continues to select the transmit speech path until the reverberation decreases to a level low enough for the reverberation not to be interpreted as the transmitted voice. As a result, the voice received in this state is blocked by the attenuator 16 and is not output from the speaker 18. In other words, receive blocking takes place.

SUMMARY OF THE INVENTION

Accordingly, the object of the present invention is to provide a voice switch in which the above problem of the conventional art is eliminated, and which switch is capable of rapid switching without receive blocking taking place. Another object of the present invention is to provide a voice switch capable of rapid switching without either a transmit blocking or a receive blocking taking place.

The above object of the present invention can be achieved by a voice switch used in a hands-free system comprising:

attenuating means for attenuating either a transmitted voice delivered from a microphone or a received voice received via a communication line and delivered to a speaker;

detecting means for detecting the transmitted voice delivered from the microphone and the received voice received via the communication line; and controlling means for controlling the attenuating means such that, when the detecting means has detected one of the voices, i.e. the transmitted voice or the received voice, the other voice is attenuated, and such that, when both the transmitted voice and the received voice (the first received voice) are detected and a second received voice is detected before a predetermined time has elapsed since the first received voice has been muted, preference is given to the second received voice over the transmitted voice detected before the second received voice, the second received voice being output to the speaker.

A description will now be given, with reference to a block diagram of FIG. 3 showing the configuration, and explaining the operating principle, of a first embodiment, the present invention. In FIG. 3, parts that are identical to parts shown in the above-mentioned figures are given the same reference numerals from figure to figure. A voice detector 36 is fed, as an input, the transmitted voice level and detects the transmitted voice. A voice detector 38 is fed, as an input the received voice level and detects the received voice. A receive preference unit 40 is fed, as an input the output signal from the voice detector 38 and measures a time (receive preference time) elapsing from the moment that the received voice stops being detected, i.e. from the moment that the received voice level drops to nil. The receive preference unit 40 keeps outputting a receive preference signal to an attenuation controller 42 until a predetermined time has elapsed.

The attenuation controller 42 effects the determining and controlling operations in accordance with the following rules, the operations being based on the output signals of the voice detectors 36 and 38, and on the receive preference signal from the receive preference unit 40.

(1) Provide a large attenuation to a signal on the receive speech path and a small attenuation to a signal on the transmit speech path in case only the transmitted voice is detected.

(2) Provide a large attenuation to a signal on the transmit speech path and a small attenuation to a signal on the receive speech path in case only the received voice is detected.

(3) Give preference to a signal on the receive speech path if the transmitted voice, in addition to the received voice, is detected within a predetermined time, measured from the moment the received voice level drops to nil.

(4) Select the transmit speech path if the transmitted voice, in addition to the received voice, is detected after a predetermined time, measured from the moment the received voice level drops to nil.

(5) Hold the line status as it is if both the transmitted voice and the received voice are muted.

The attenuation controller 42 controls the attenuators 12 and 16 in accordance with the above rules.

Transmit blocking can be prevented by adding to the above configuration a transmit preference unit 140, (FIG. 10) so that the attenuators are controlled to output, when a new transmitted voice is detected before a transmit preference time has elapsed since the transmitted voice became muted, the new transmitted voice to the communication line in preference to received voice detected earlier.

In the aforementioned conventional art, the receive blocking takes place in such a manner that the reverberation of the received voice that has reached the system is interpreted as the transmitted voice even after the level of the received voice that produced the reverberation (echo) has dropped to nil and that the voice switch is then switched to the transmit speech path in the absence of an actual transmmtted voice. Contrastingly, the above-mentioned rule (3) of the present invention ensures that preference is given, within the receive preference time, to the received voice even after the received voice level has dropped to nil. As a result, even in the presence of a reverberation, the voice switch is switched to the receive speech path if the voice is received again within the receive preference time. Accordingly, the received voice is not blocked due to the reverberation.

As described later, the setting of the receive preference time can be based on various factors. For example, the receive preference time can be set to a period of time long enough for the reverberation not to be interpreted as the transmitted voice. In this case, the receive preference time which is to be set depends on the reverberation time and the noise level of the room. The receive preference time can also be set to a period of time just as long as a period of time for which a mute period lasts prior to pronunciation of a plosive consonant or an affricate.

In a similar manner, the transmit blocking can also be prevented by giving preference, within the transmit preference time, to the transmitted voice even after the transmitted speech has been muted.

Other objects and further features of the present invention will be apparent from the following detailed description when read in conjunction with the accompanying drawings.

DESCRIPTION OF THE PREFERRED EMBODIMENTS

Figure 3:
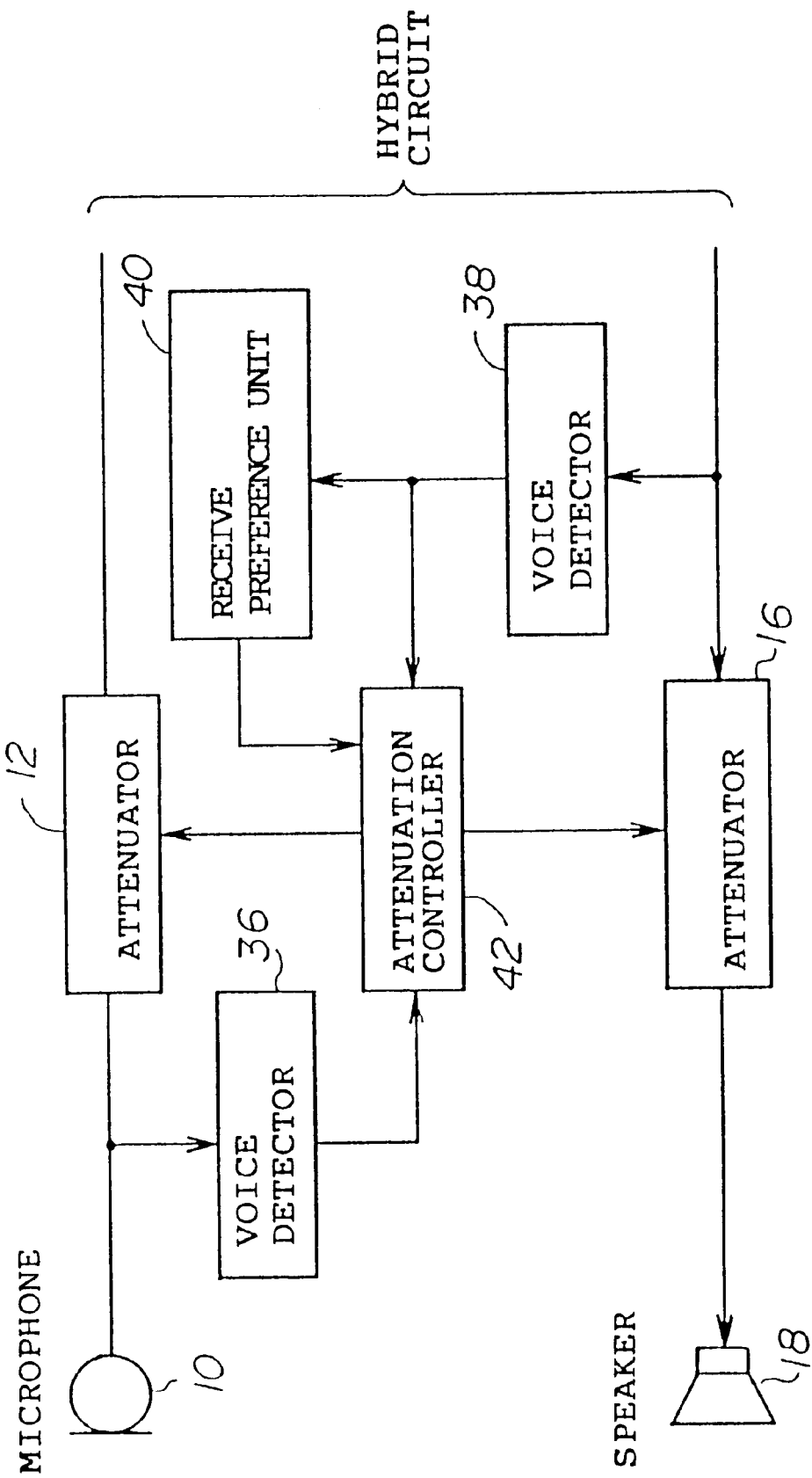
FIG. 3 is a block diagram showing the principle of a first embodiment of the present invention.
Figure 4:
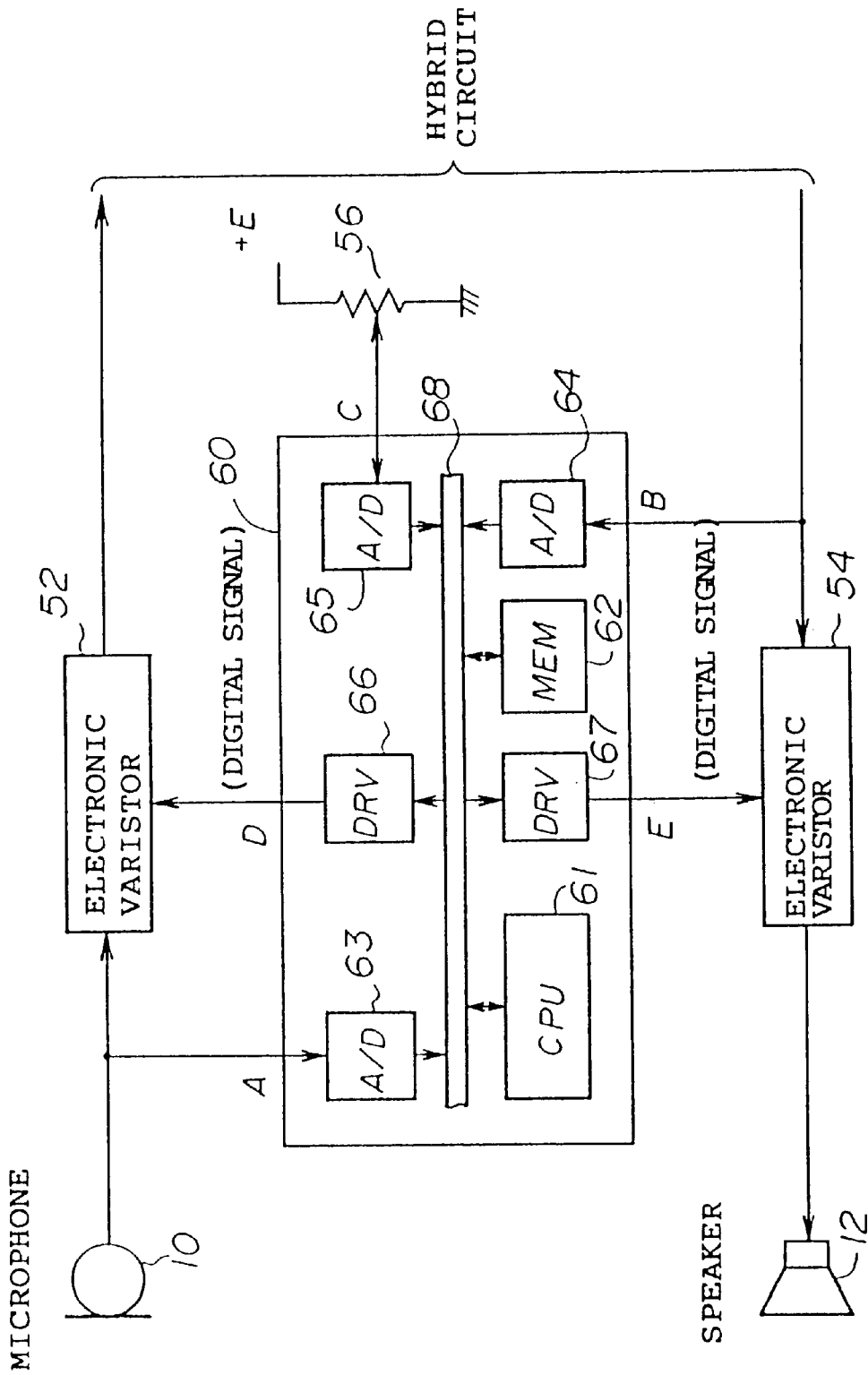
FIG. 4 is a detailed block diagram of the first embodiment.

FIG. 4 is a block diagram showing the voice switch of a first embodiment of the present invention. The voice switch shown in the figure comprises: electronic varistors 52 and 54; a varistor 56; and a microprocessor 60. The electronic varistors 52 and 54 correspond to attenuators 12 and 16 of FIG. 3. The varistor 56 forms a part of the receive preference unit 40 of FIG. 3. The microprocessor 60 implements the voice detectors 36 and 38, the attenuation controller 42 and a part of the receive preference unit 40 of FIG. 3. The electronic varistors 52 and 54 are embodied by, for example, MB84066B from Fujitsu Co. Ltd. The microprocessor 60 comprises: a central processing unit (hereinafter, simply referred to as a CPU) 61; a memory (MEM) 62; analog/digital converters (hereinafter, referred to as an A/D converter) 63, 64 and 65; and drivers (DRV) 66 and 67. These components are connected to an internal bus 68. The A/D converter 63 converts a transmitted voice A from the microphone 10 into a digital signal. The A/D converter 64 converts a received voice B into a digital signal. The A/D converter 65 converts a potential set by means of the varistor 56 into a digital signal C. As described later, the potential set by the varistor 56 corresponds to the aforementioned receive preference time. The varistor 56 is connected to a power system having two voltage levels: a +E volt (for example, 5 volts) and a ground level. The microprocessor 60 controls the electronic varistor 52 by outputting a control signal D via the driver 66, and also controls the electronic varistor 54 by outputting a control signal E via the driver 67. The CPU 61 controls the operation of the voice switch as a whole. The memory 62 stores programs and data necessary for the operation of the CPU 61.

Figure 1:
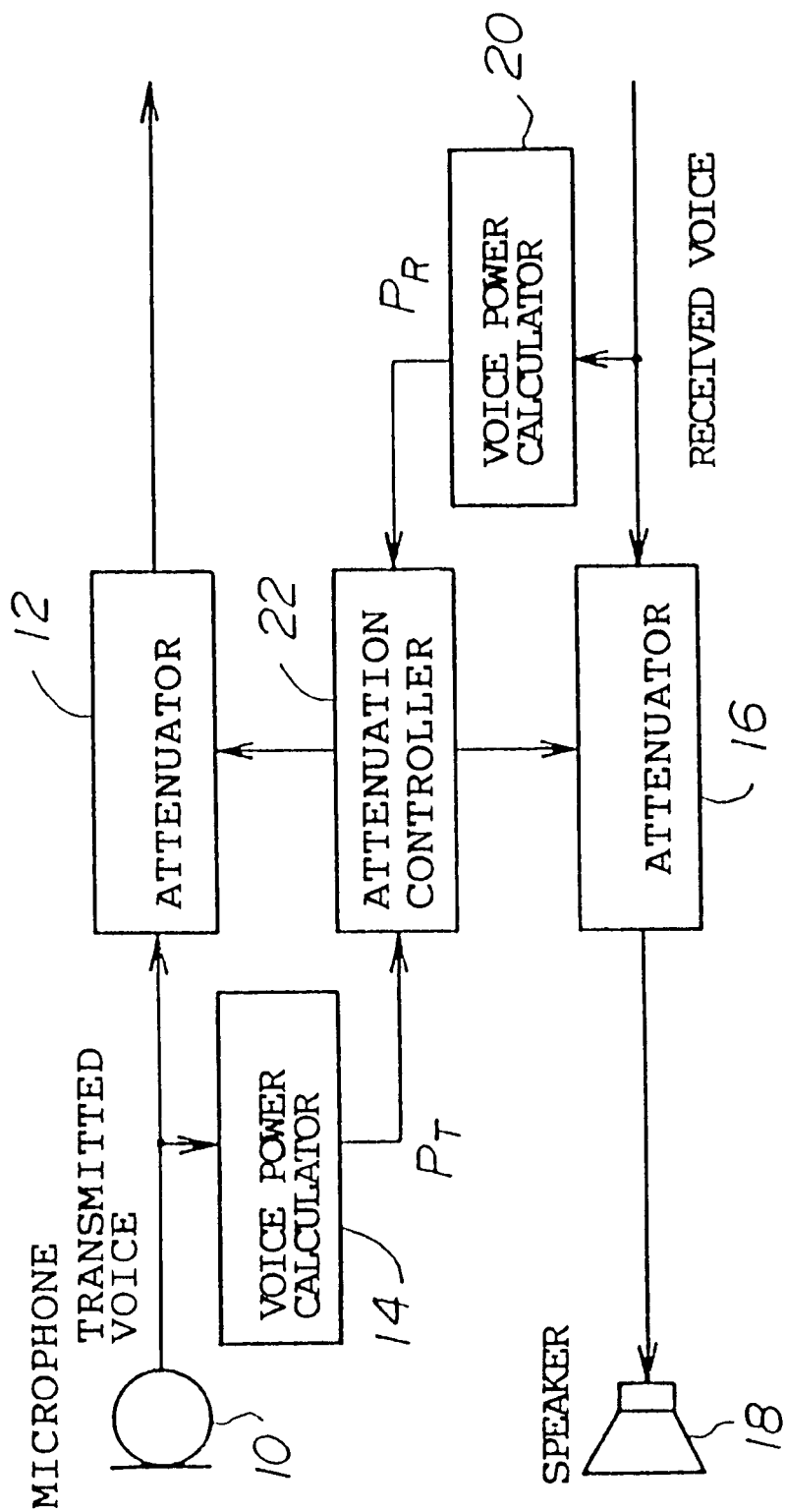
FIG. 1 is a block diagram of a conventional voice switch.
Figure 2:
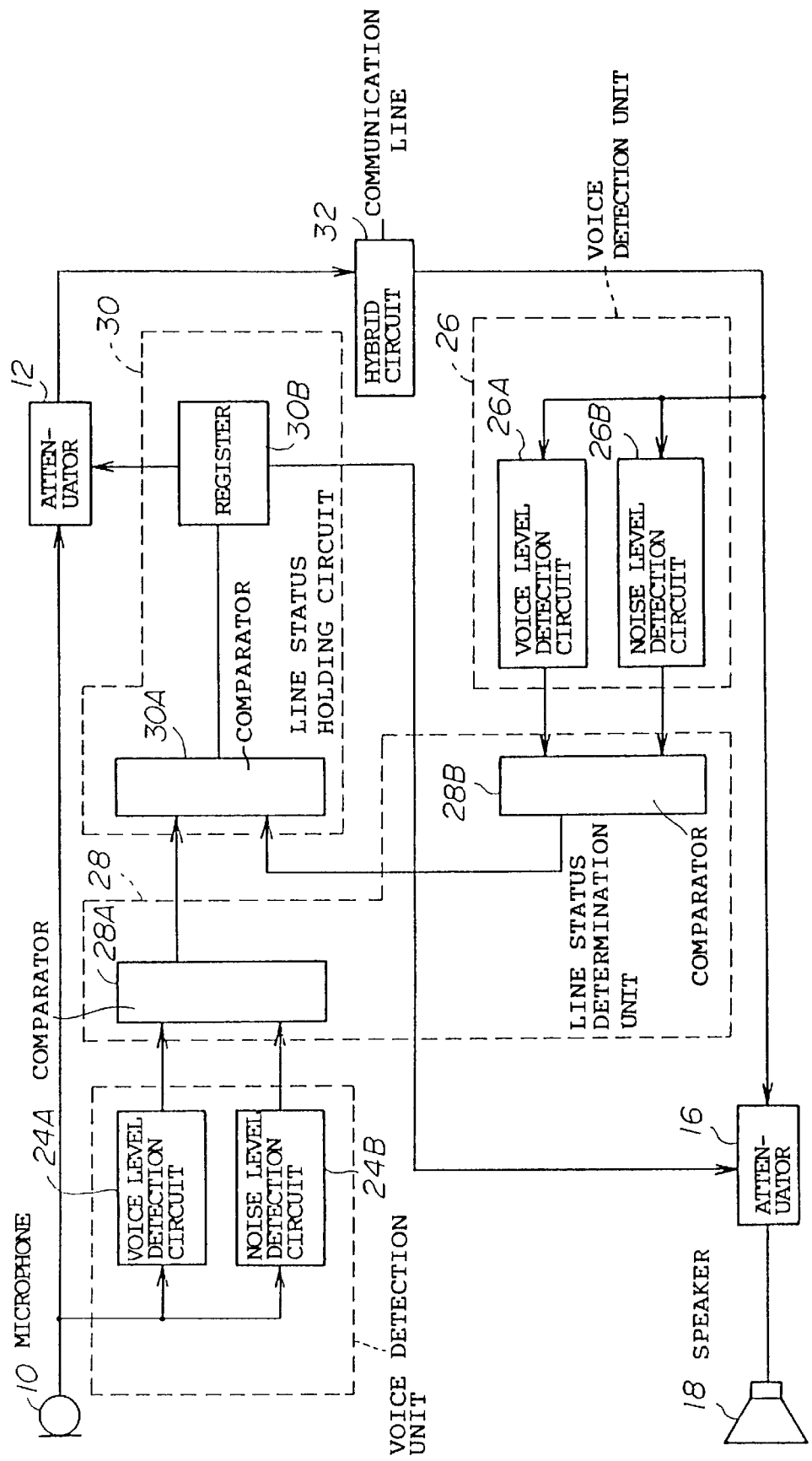
FIG. 2 is a block diagram of another conventional voice switch.

The aforementioned receive preference time is provided so that preference is given to the received speech path until the reverberation of the received voice output from the speaker 12 decreases to a level not high enough to be interpreted as the transmitted voice. For example, when the the reverberation time of the room is one second and an attenuation of about 30 dB at the maximum is required before the reverberation decreases below the threshold level at which a determination is made that the transmitted voice is detected, which level is determined on the basis of the noise level, the receive preference time is set to about 500 ms. Thus, the receive preference time during which preference is given to the receive voice is determined on the basis of the reverberation time of the room and on the basis of the noise level of the room. The receive preference time during which preference is given to the received voice may be constant if a communication unit equipped with the voice switch is permanently installed in a room especially set aside for the purpose of teleconference or the like, and, therefore, the reverberation and the noise are at a constant level. Accordingly, a fixed resistor can substitute for the varistor 56. On the other hand, it is desirable that the receive preference time during which preference is given to the received voice be varied when the system including the voice switch is transferable to various locations, such as in the case of a hands-free telephone set, and when the reverberation time and the noise level cannot be readily determined. For this purpose, the configuration of FIG. 2 provides the varistor 56 so that the receive preference time can be varied.

The CPU 61 implements, by software means, the voice detectors 36 and 38. The voice detectors 36 and 38 detect whether or not the transmitted voice or the received voice is delivered along a speech path, on the basis of the level of the signal delivered. For this purpose, a low-pass filter is utilized, the time constant thereof being specified in accordance with the following considerations. First, the time constant of the low-pass filter needs to be small enough for a mute period to be readily detected as such, in order to effect a rapid switching of the talking direction. In case the time constant has a minimum value, that is, zero, the low-pass filter detects whether or not the voice is delivered along the speech path, on the basis of the instantaneous amplitude of the voice signal. In such a case, the party at the other end of the communication line will hear a discontinuous reverberation and a transmitted voice having brief intermissions, in correspondence with variations in the amplitude of the received voice, while the received voice continues to be output from the speaker 12 irrespective of whether or not there is any transmitted voice delivered because preference is given to the received voice. Such a configuration has an advantage in that the speech of the transmitting party can be delivered more readily than in any other configuration, but has a disadvantage in that a problem remains with the quality of communication.

Alternatively, a time constant may be used which is large enough for the voice switch to wait for a period of time corresponding to the length of a syllable before being switched. In such a case, the time constant is set to be large enough so that a mute period, which occurs between a plosive consonant and a subsequent vowel or between a pitch of a voice and a subsequent vowel, is not interpreted as a time interval period. That is, a time constant on the order of 20—several tens of microseconds is chosen.

Figure 5:
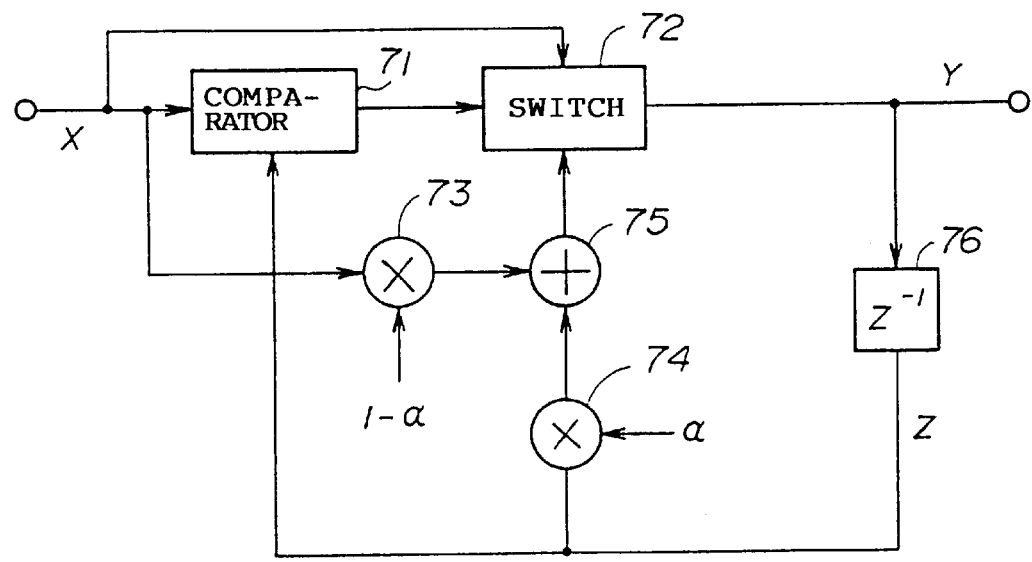
FIG. 5 is a block diagram showing the configuration of a voice level calculating filter used in the embodiments of the present invention.

Even if the above configuration is employed, in which the voice detection is effected not on the basis of the instantaneous amplitude but on the basis of the time constant having a certain value, output growth characteristics of the low-pass filter need to be sharp enough for a discontinuity at the beginning of a conversation not to take place. An example of a voice level detection low-pass filter that meets this requirement is shown in FIG. 5. The filter of FIG. 5 comprises: a comparator 71; a switch 72; multipliers 73 and 74; an adder 75; and a delay element 76. A coefficient $\alpha$ determines the time constant of the filter. Provided that an input signal to the filter is X, an output Z is thereof is Y, and a signal obtained as a result of delaying, by a unit time, the output signal Y, the switch 72 operates in the following manner.

If $X \geq Z$, then $Y = X$

If $X < Z$, then Y is the output of the adder 75.

With such a filter, there is a chance that the noise may be interpreted as a voice because the output of the filter grows in response to an instantaneous amplitude, substantially. Accordingly, cumulative amplitude (an absolute value or a square value of the amplitude) for the sampling period is calculated when the noise is abundant, the signal obtained after the noise is suppressed being fed to the filter as the input signal X.

Figure 6:
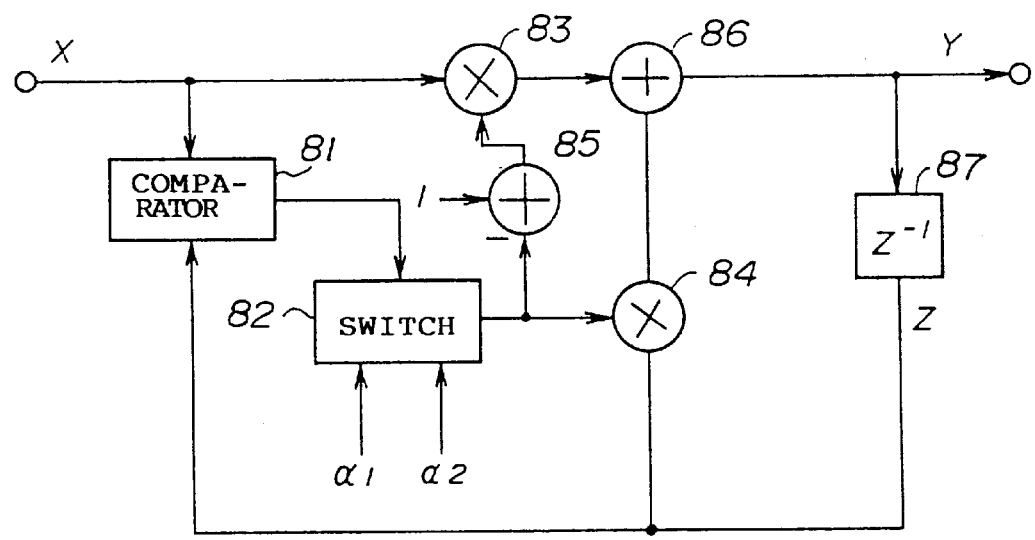
FIG. 6 is a block diagram showing the configuration of a noise level calculating filter used in the embodiments of the present invention.

In this embodiment, a low-pass filter as shown in FIG. 6 for detecting the noise level is employed in addition to the signal detection filter mentioned above. The low-pass filter of FIG. 6 includes: a comparator 81; a switch 82; multipliers 83 and 84; adders 85 and 86; and a delay element 87. The comparator 81 compares the input signal X with the signal Z obtained as a result of delaying, by a unit time, the output signal Y, and also controls the switch 82 in the following manner.

If $X \geq Z$, then $\alpha 1$

If $X < Z$, then $\alpha 2$ $\alpha 1$ is a constant which approximates 1 for setting a large time constant. $\alpha 2$ is a constant smaller than 1 for setting a small time constant. This way, the detection of the noise level is executed such that the growth time constant is made relatively large and the decay time constant is made relatively small, i.e., decay an output from the filter grows relatively slowly when the voice is input, while the output from the filter decays rapidly when the voice level drops to nil.

Even with a large growth time constant, the filter output gradually increases when a voice is input, making it difficult to detect a subsequent voice. Such a feature can be taken advantage of, and the time constant of the low-pass filter for calculating the noise level on the transmit path can be made large enough, for example, to correspond to the reverberation time, so that a chance is decreased that the reverberation is interpreted as the transmitted voice. This way, the receive preference time can be shortened.

A consideration will now be given to a four-wire system having no antisidetone circuit, to which system the present invention is applied. The transmitted voice is not picked up by the receive path, and the reverberation is not output by the speaker 12. Consequently, the voice switch continues to be connected to the transmit path as long as no voice is received from the other party. This holds true even if the voice detection effected on the transmit path is based on the instantaneous amplitude. However, when noise is abundant on the receive path, thus increasing a chance that the noise is interpreted as the voice, the voice switch may be easily switched due to the noise. Accordingly, the selection of the filter time constant is an effective way to decrease a likelihood of such a malfunction. However, even when such measures are taken, it is impossible to achieve a rapid switching to the receive mode by decreasing the filter time constant to be smaller than that of the filter used on the receive path. It is to be noted that, when there is no chance that the reverberation of the transmitted voice is picked up by the receive speech path, it is not necessary to provide the transmit preference time, whereupon the voice switch can be readily switched to the receive speech path upon the detection of the received voice.

The microprocessor 60 affords, by software means, the functions of the low-pass filters shown in FIGS. 5 and 6 for realizing the voice detection circuits 24 and 26 shown in FIG. 2.

Figure 7:
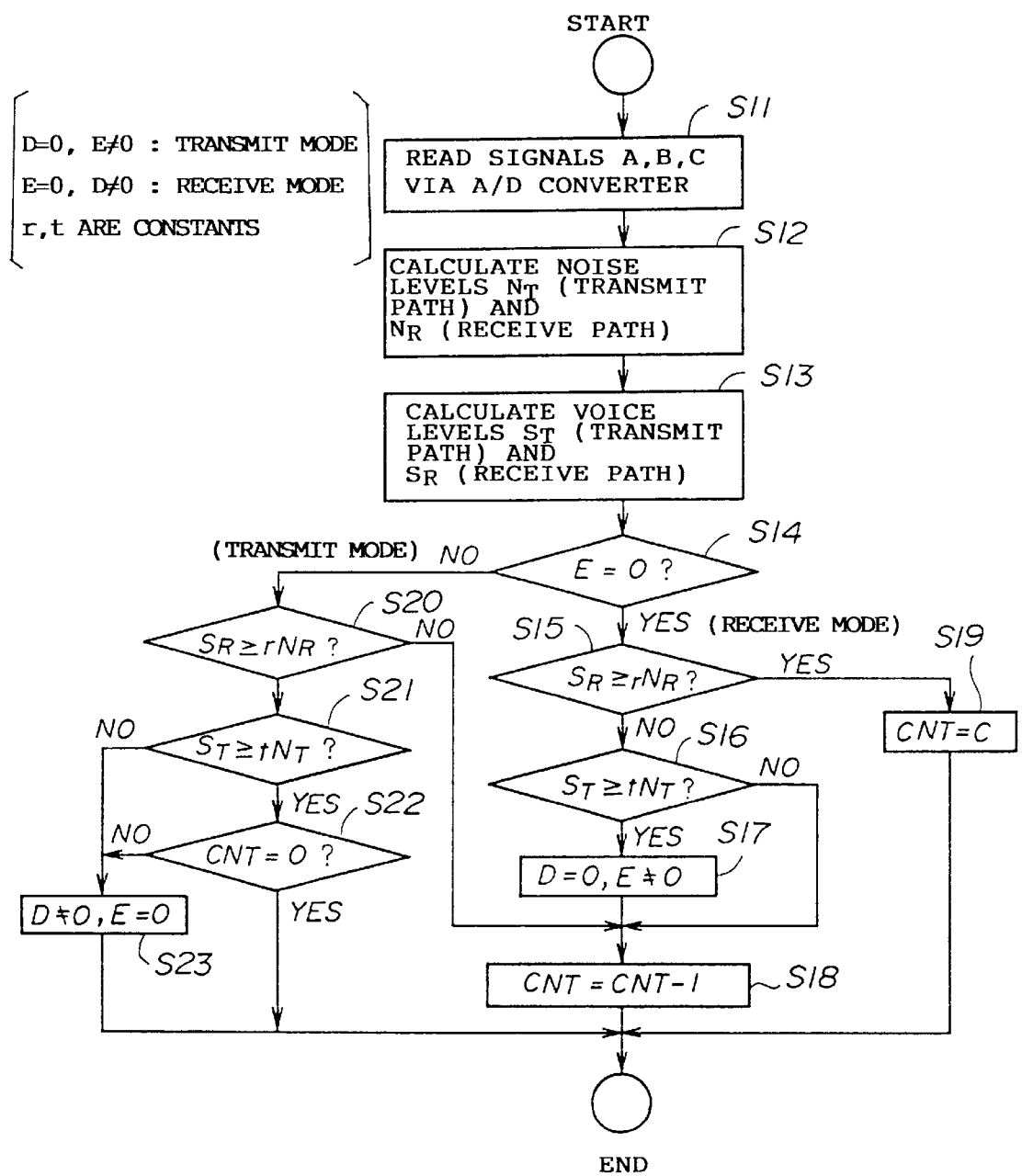
FIG. 7 is a flowchart showing the operation of the first embodiment.

A description will now be given, with reference to an operational flowchart of FIG. 7, of the operation of a first embodiment shown in FIG. 4 according to the present invention. The steps in the flowchart of the FIG. 7 are executed at predetermined intervals. The CPU 61 shown in FIG. 4 receives inputs of a signal A from the microphone 10, a signal B from the communication line and a potential signal C set by means of the varistor 56, via the A/D converters 63, 64 and 65, respectively (step S11). Subsequently, the CPU 61 calculates a noise level NT on the transmit path and a noise level $N_R$ on the receive path (step S12). The calculation of the noise levels $N_T$ and $N_R$ is executed by software means by using the noise level calculating filter of FIG. 6. The CPU 61 then calculates a voice level $S_T$ on the transmit path and a voice level $S_R$ on the receive path (step S13). The calculation of the voice levels $S_T$ and $S_R$ is executed by software means by using the voice level detection filter of FIG. 5.

The CPU 61 then determines whether or not a flag E is zero (step S14). The flag E indicates whether or not a communication unit having a voice switch is in a receive mode (in which the voice switch is switched to the receive path). When the flag E is zero, the communication unit is in the receive mode. When the flag E is zero, the CPU 61 determines whether or not $S_R \geq rN_R$ holds true (step S15), where r is a predetermined constant. When the answer YES results from the determination in step S15, in other words when a determination is made that there is a received voice, the CPU 61 sets an internal counter CNT to a counter value C (step S19). The counter value corresponds to a potential set by means of the varistor 56 shown in FIG. 4. This counter value corresponds to the aforementioned receive preference time. After the counter value is set in step S19, the process is terminated.

When it is determined in step S15 that $S_R < rN_R$, that is, when it is determined that there is no received voice, the CPU 61 determines whether or not $S_T \geq tN_T$ holds (step S16), where t is a predetermined constant. When the answer YES results from the determination of step S16, in other words when it is determined that only the transmitted voice is present, the CPU 61 sets a flag D to zero, and also sets the flag E to an arbitrary value not equal to zero (step S17). The flag D indicates whether or not the communication unit is in a transmit mode. When the flag D is zero, the communication unit is in a transmit mode. The CPU 61 then decrements the counter value CNT by 1 (step S18). The process is then terminated.

When it is determined in step S14 that the flag E is not zero, in other words when the voice switch has selected the transmit mode, the CPU 61 determines whether or not $S_R \geq rN_R$ holds (step S20). If the answer of this determination is NO, in other words if it is determined that there is no received voice, the CPU 61 executes the aforementioned step S18. If the answer of this determination in step S20 is YES, in other words if it is determined that there is a received voice, the CPU determines whether or not $S_T \geq tN_T$ holds (step S21). When the answer of this determination is YES, in other words if it is determined that there is a transmitted voice, the CPU 61 determines whether or not the counter value CNT is zero (step S22). When the counter value is zero, the process is terminated.

When the answer of the determination of step S21 is NO, in other words if it is determined that there is no transmitted voice; or when the answer of the determination of step S22 is NO, in other words when the receive preference time has not expired, the CPU 61 sets the flag D to an arbitrary value not equal to zero, and also sets the flag E to zero (step S23). The CPU 61 then terminates the process.

When the received voice is detected (step S20) prior to the expiration of the receive preference time C (step S22) while the voice switch is selecting the transmit mode, the voice switch is switched to the receive mode even when the transmitted voice is detected (step S21). Accordingly, a receive blocking, in which the received voice is blocked due to the reverberation of the received voice, can be prevented.

Figure 8:
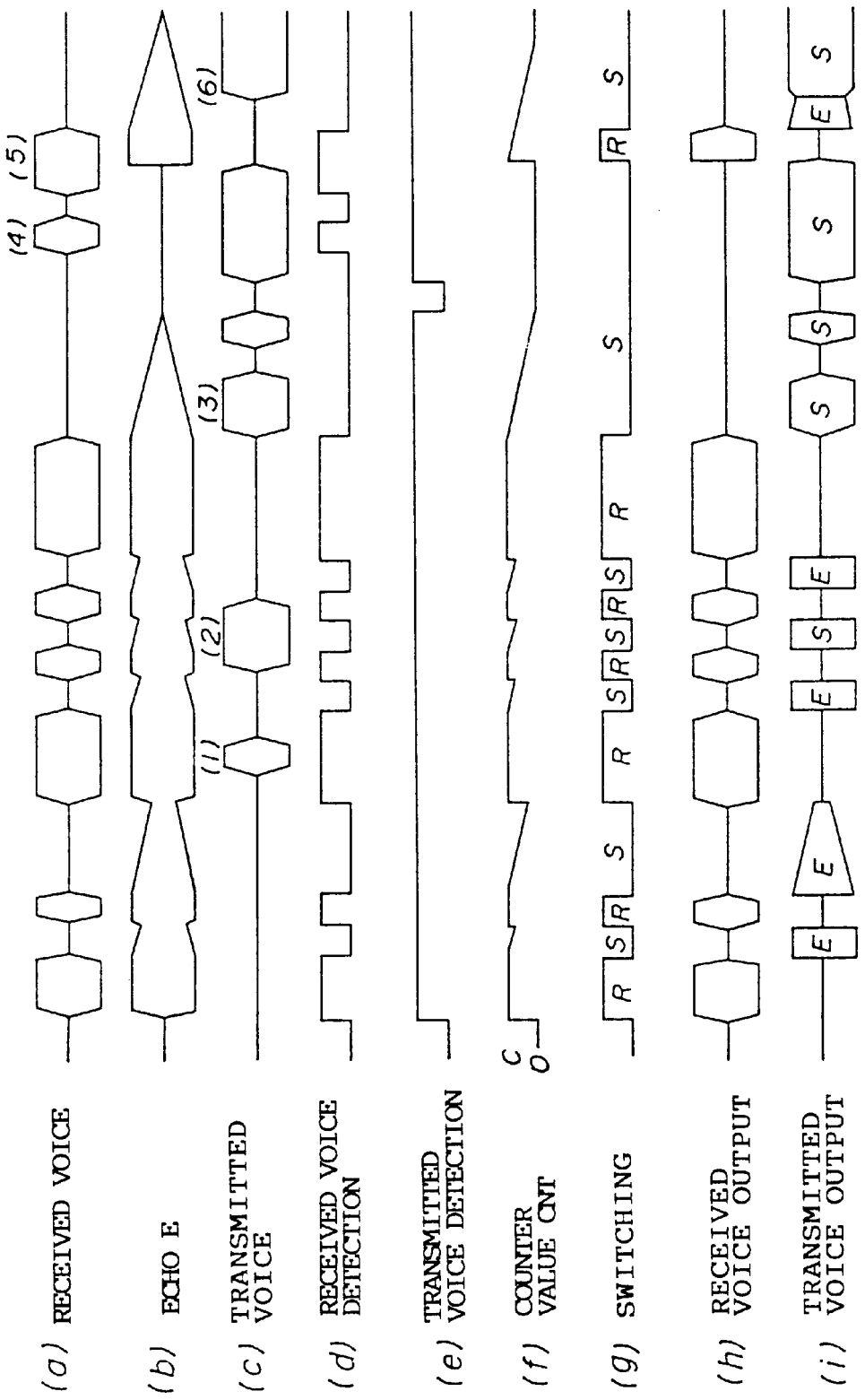
FIG. 8 is a timing chart showing the operation of the first embodiment.

FIG. 8 is an example of a waveform chart explaining the timing of operations of the first embodiment of the present invention. FIG. 8(a), FIG. 8(b) and FIG. 8(c) show graphs of a received voice, a reverberation and a transmitted voice, respectively. FIG. 8(d) represents the determination results of the steps S15 and S20. The high level of the signal in FIG. 8(d) indicates a detection of the received voice. FIG. 8(e) represents the determination results of the steps S16 and S21. A high level of the signal in FIG. 6(d) indicates a detection of the transmitted voice. FIG. 8(f) shows a counter value CNT indicating how much of the receive preference time has elapsed. FIG. 8(g) indicates the switching of the voice switch. In FIG. 8(g), R denotes the selection of the received voice, and S denotes the selection of the transmitted voice. FIG. 8(h) shows the received voice output, and FIG. 8(i) shows the transmitted voice output.

It is shown that, in a time frame (1) in FIGS. 8(a)–8(i), both the received voice and the transmitted voice (noise) are detected. Since the receive preference time has not expired (the counter value CNT has not become zero), the received voice, not the transmitted voice, continues to be output. Accordingly, there is no fear that the received voice is blocked by the noise. In a time frame (2) in FIGS. 8(a)–(i), there is a sequence of received voices having a short intermission of a mute period. During this mute period, the transmitted voice and the reverberations of the received voice are intermittently transmitted. In a time frame (3) of FIGS. 8(a)–(i), the voice switch selects the transmitted voice immediately after the received voice has ceased to be received. It is to be noted that preference is given to the received voice while the receive preference period has not expired. In a time frame (4) of FIGS. 8(a)–(i), the received voice is detected after the receive preference time has expired. This received voice, which is received while the transmitted voice keeps being detected, is neglected according to the rule (4) set forth earlier. In a time frame (5) of FIGS. 8(a)–(i), the voice switch is switched to the received voice immediately after the transmitted voice is discontinued. In a time frame (6) of FIGS. 8(a)–(i), the transmitted voice is output because the received voice has not been received during the receive preference time.

While the receive preference time has been described as being based on the period that elapses before the reverberation decreases to a level low enough for it not to be interpreted as the transmitted voice (the period being determined according to the reverberation time of the room and the noise level of the room), the receive preference time can also be set in the following manner.

Figure 9:
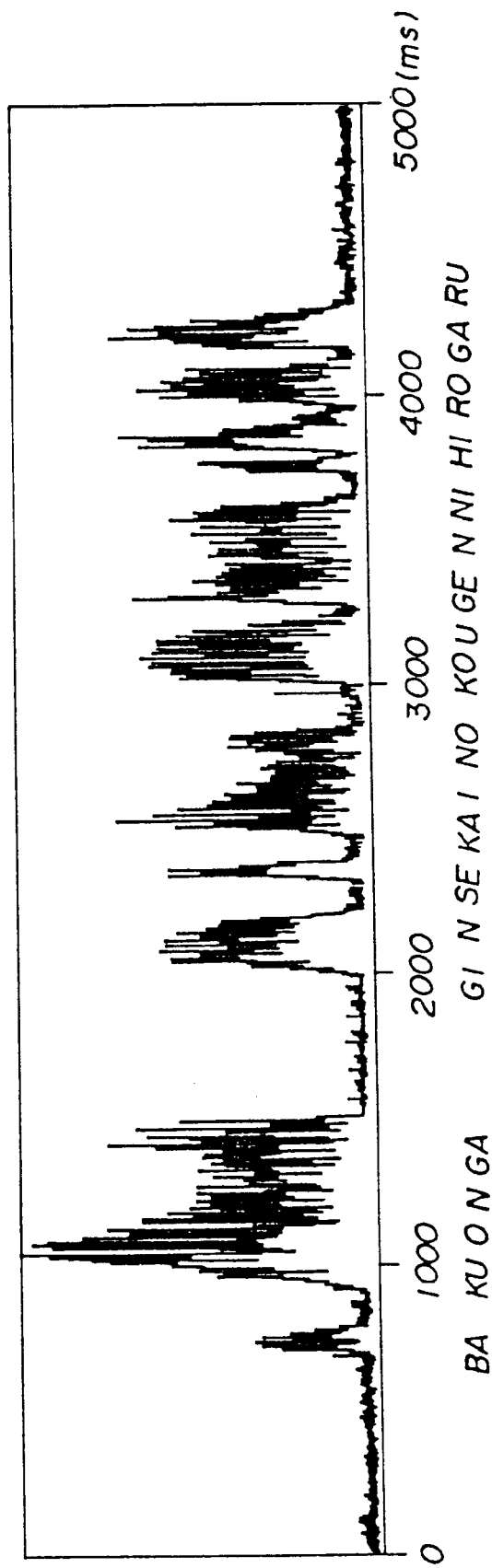
FIG. 9 shows an example of a speech pattern.

FIG. 9 shows a sample female voice constituting a speech "BA-KU-O-N-GA-GI-N-SE-KA-I-NO-KO-U-GE-N-NI-HI-RO-GA-RU". It is found from this figure that mute periods can be classified into three categories.

(a) a mute period lasting as long as 100–200 ms and occurring prior to a pronunciation of a plosive consonant or an affricate.

(b) a short breathing spell lasting as long as 500 ms and corresponding to a comma.

(c) a long-lasting mute period following a sentence and corresponding to a period.

If we now assume that the system including the voice switch is used in a room in which the reverberation time is relatively short (about 100 ms) and the reverberation decreases before it has a chance to be interpreted as the transmitted voice, the receive preference time is set to be about 100 ms, according to the principle of the present invention. In actuality, there is a constant supply of low noise or voice, such as a sound of a thing dropped or a voice showing an agreement, which it is not necessary to be conveyed to the other party. Since the mute period (a) mentioned above resides in the middle of a word, an interruption of the speech there results in unintelligibleness. It is more practical that a meaning block be designated as a unit on the basis of which the voice switch is switched. Therefore, the predetermined time stated in the aforementioned rules (3) and (4) can be equal to the mute period (100–200 ms) occurring prior to a pronunciation of a plosive consonant or an affricate. Accordingly, the rules (3) and (4) can be rewritten as follows.

(3) Preference is given to the received voice during the mute period occurring prior to a pronunciation of a plosive consonant or an affricate.

(4) The line status is held as it is after the above-mentioned mute period.

A combination of two methods of setting the receive preference time is possible: namely, the setting based on the above-mentioned mute period, and the setting based on the reverberation time of the room and on the basis of the noise level of the room. For example, the receive preference time set on the basis of the mute period may be designated as a basic preference time (lower limit of the receive preference time), and this basic preference time may be modified in accordance with the actual conditions including the reverberation time of the room and the noise level of the room. In this case, the counter value becomes such that CNT=C+Cmin, where C denotes an additional receive preference time determined on the basis of the reverberation time of the room and the noise level of the room, and Cmin denotes the mute period occurring prior to a pronunciation of a plosive consonant or an affricate.

Figure 10:
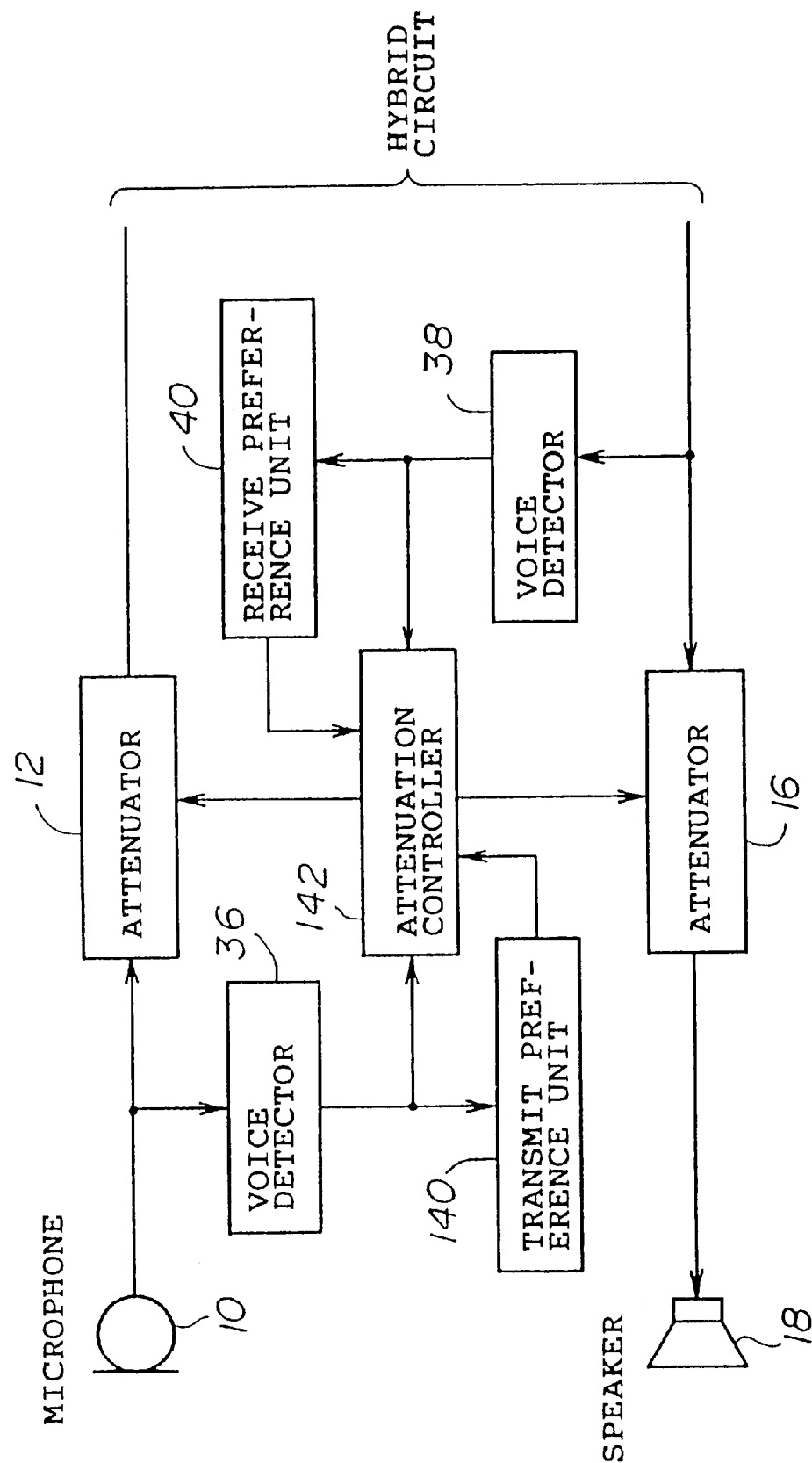
FIG. 10 is a block diagram showing the principle of a second embodiment of the present invention.

A description will now be given of a second embodiment of the present invention. FIG. 10 is a block diagram showing the principle of the second embodiment of the present invention. In the figure, those components that are identical to components of FIG. 3 are designated by the same reference numerals from figure to figure. In addition to the components of FIG. 3, the second embodiment includes a transmit preference unit 140. An attenuation controller 142 is used to control the attenuators 12 and 16 by taking into account a transmit preference signal output from the transmit preference unit 140.

In the second embodiment, the transmit blocking, caused by the reverberation of the received voice at the other end of the line and by the reverberation leaked from the hybrid circuit, as well as the receive blocking, is prevented from occurring.

The attenuation controller 142 operates as follows.

(1) When the received voice is detected during the receive preference time or after the receive preference time has expired, the received voice is selected.

(2) When the received voice is not detected after the receive preference time has elapsed, the current selection is maintained, i.e. the received voice continues to be selected.

(3) When the transmitted voice is detected after the receive preference time has elapsed, the transmitted voice is selected.

(4) When the transmitted voice is detected during the transmit preference time or after the transmit preference time has expired, the transmitted voice is selected.

(5) When the transmitted voice is not detected after the transmit preference time has expired and the mute period has set in, the current selection is maintained, i.e. the transmitted voice continues to be selected.

(6) When the received voice is detected after the transmit preference time has expired, the received voice is selected.

In this manner, the second embodiment can resolve both the transmit blocking and the receive blocking.

Figure 11:
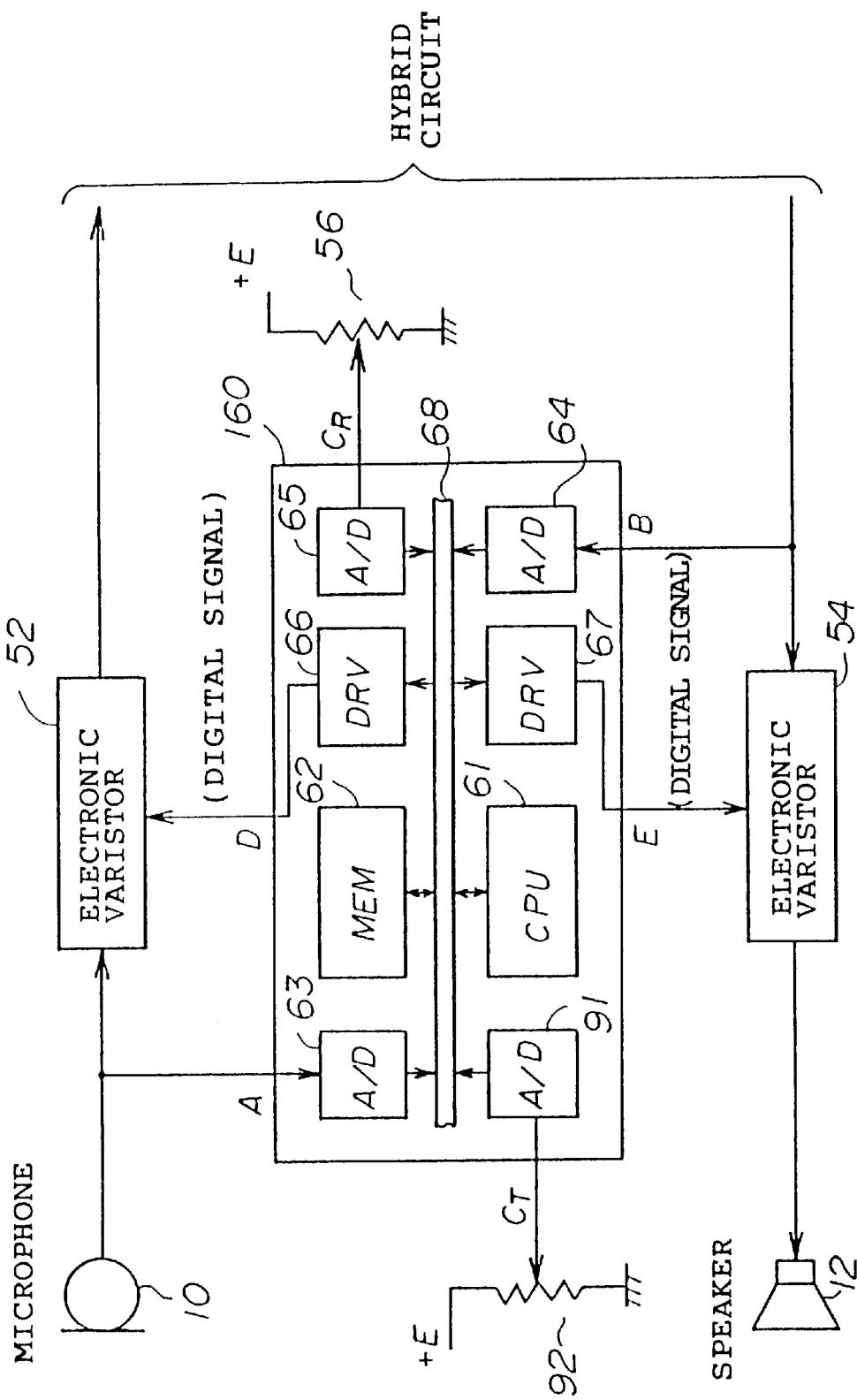
FIG. 11 is a detailed block diagram of the second embodiment.

FIG. 11 is a block diagram of the second embodiment of the present invention. In the figure, components that are identical to parts of FIG. 4 are designated by the same reference numerals from figure to figure. There is provided a varistor 92 corresponding to the transmit preference unit 140 of FIG. 10. A microprocessor 160 in this embodiment includes an A/D converter 91 connected to the varistor 92. A potential (receive preference time) set by means of the varistor 56 is denoted as $C_R$, and a potential (transmit preference time) set by means of the varistor 92 is denoted as $C_T$.

Figure 12:
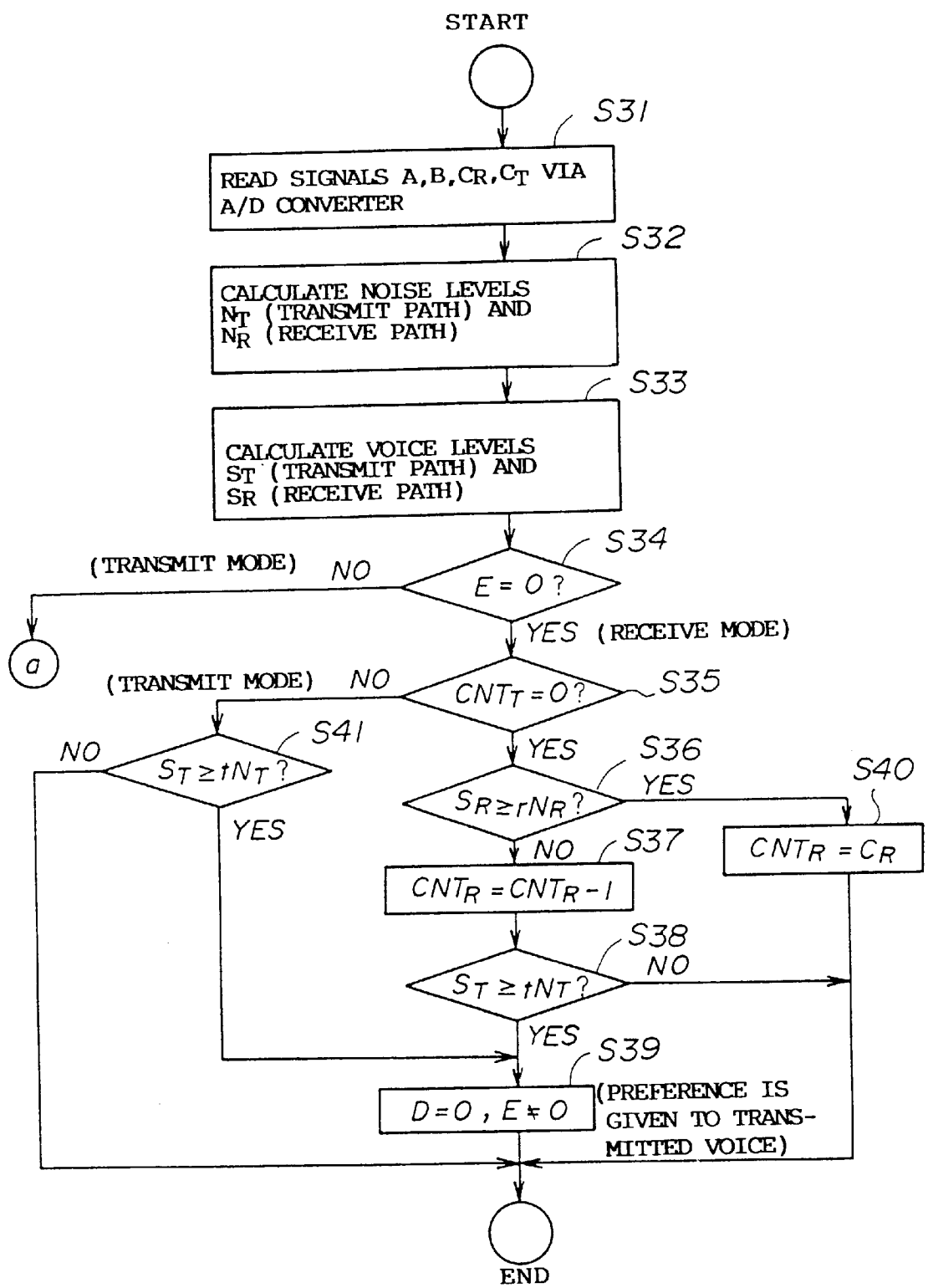
FIG. 12 is a flowchart (part 1) showing the operation of the second embodiment.

A description will now be given, with reference to operational flowcharts of FIGS. 12 and 13, of the operation of the voice switch of FIG. 11. The CPU 61 of the microprocessor 160 shown in FIG. 11 is fed inputs of the signal A from the microphone 10, the signal B from the communication line, the potential signals $C_R$ and $C_T$ set by means of the respective varistors 56 and 92, via the A/D converters 63, 64, 65 and 66, respectively (step S31). Subsequently, the CPU 61 calculates the noise level $N_T$ of the transmit path and the noise level $N_R$ of the receive path (step S32). The calculation of these noise levels $N_T$ and $N_R$ is executed by software means using the aforementioned noise level calculating filter of FIG. 6. The CPU 61 then calculates the voice level $S_T$ of the transmit path and the voice level $S_R$ of the receive path (step S33). The calculation of these voice levels $S_T$ and $S_R$ is executed by software means using the aforementioned voice level calculating filter of FIG. 5.

The CPU then determines whether or not the flag E is zero (step S34). As mentioned before, the flag E indicates whether or not a communication unit having the voice switch is in the receive mode (in which the voice switch is switched to the receive path). When the flag E is zero, the unit is in the receive mode. Upon determining that the flag E is zero, the CPU 61 determines whether or not a counter value $CNT_T$ is set to zero (step S35). When the counter value $CNT_T$ is zero, the CPU 61 determines whether or not there is a received voice (step S36). When it is determined that there is a received voice, the CPU 61 sets a counter value $CNT_R$, which is set to obtain a desired receive preference time, to a counter value CR corresponding to the potential set by means of the varistor 56 (step S40). The CPU 61 then terminates the process.

When the received signal is not detected in step S36, the CPU 61 decrements the counter value $CNT_R$ by 1 (step S37). The CPU 61 then determines whether or not the transmitted voice is detected (step S38). When the transmitted voice is not detected, the CPU 61 terminates the process. When the transmitted voice is detected, the CPU 61 sets the flag D to zero, and sets the flag E to an arbitrary value not equal to zero (step S39). This causes the communication unit to be in the transmit mode.

Figure 13:
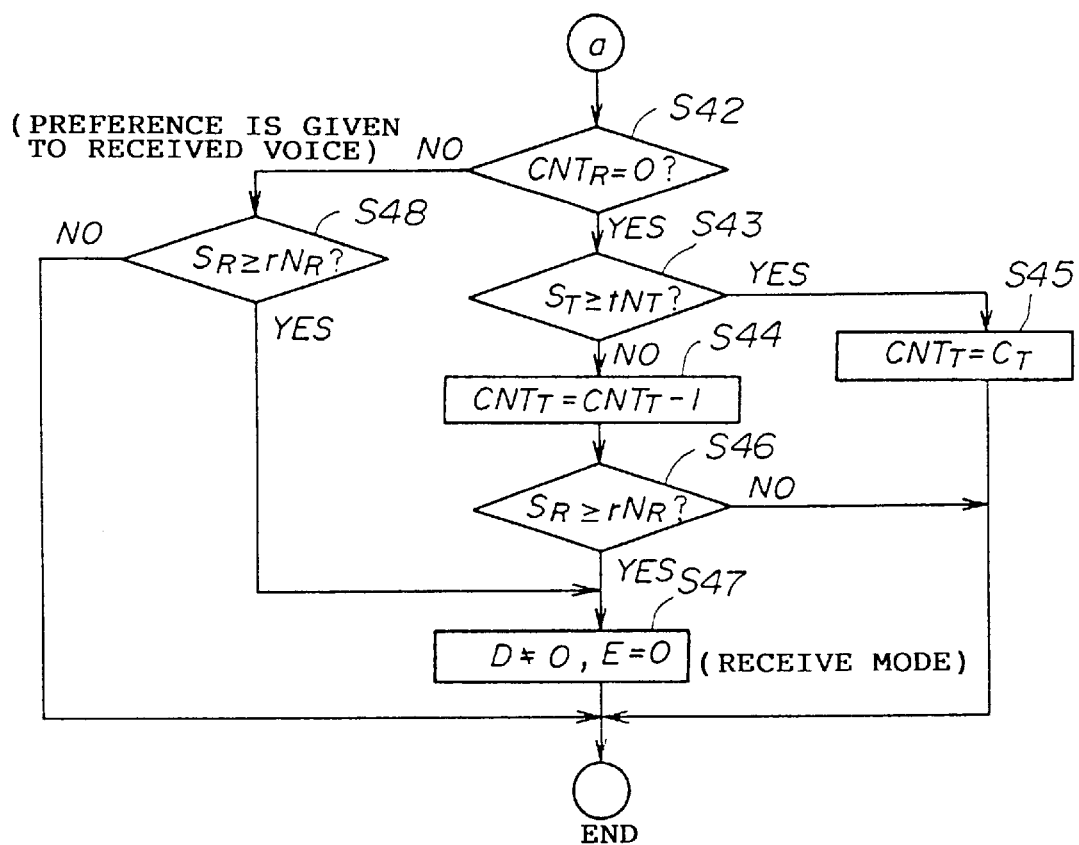
FIG. 13 is a flowchart (part 2) showing the operation of the second embodiment.

When it is determined in step S34 that the flag E is not zero, the CPU 61 executes the steps of FIG. 13. The steps of FIG. 13 will be described later.

When it is determined in step S35 that the counter value $CNT_T$ is not zero, the CPU 61 determines whether or not the transmitted voice is detected (step S41). When the transmitted voice is detected, the CPU 61 executes the step S39 so as to put the communication unit in the transmit mode. When the transmitted voice is not detected, the CPU 61 terminates the process.

Referring to FIG. 13, the CPU 61 determines whether or not the counter value $CNT_R$, which is used to measure how much of the receive preference time has elapsed, is zero. When the counter value $CNT_R$ is zero, the CPU 61 determines whether or not the transmitted voice is detected (step S43). When the transmitted voice is detected, the CPU 61 sets the counter value $CNT_T$, which is used to measure how much of the transmit preference time has elapsed, at a counter value $C_T$ corresponding to the potential set by means of the varistor 92 (step S45). The CPU 61 then terminates the process. When the transmitted voice is not detected in step S43, the CPU 61 decrements the counter value by 1 (step S44). The CPU 61 determines whether or not the received voice is detected (step S46). When the received voice is not detected, the CPU 61 terminates the process. When the received voice is detected, the CPU 61 sets the flag D to any value not equal to zero, and sets the flag E to zero (step S47).

This way, the communication unit is put in the receive mode.

When it is determined in step S42 that the counter $CNT_R$ is not zero (preference is given to the received voice), the CPU 61 determines whether or not the received voice is detected (step S48). When the received voice is detected, the CPU 61 executes step S47. When the received voice is not detected, the CPU 61 terminates the process.

As has been described thus far, the present invention makes it possible to provide a voice switch capable of being switched rapidly without causing receive blocking or transmit blocking.

The present invention is not limited to the above described embodiments, and variations and modifications may be made without departing from the scope of the present invention.

What is claimed is:

1. A voice switch, used in a hands-free communication system, comprising:
    attenuating means for attenuating a selected one of a transmitted voice signal, delivered from a microphone to a transmit communication line, and a received voice signal, received via a receive communication line and delivered to a speaker producing a corresponding audio output;
    detecting means for detecting a transmitted voice signal on the transmit communication line and a received voice signal on the receive communication line and for producing respective, transmitted and received voice signal detection outputs, each detection output being produced for the duration of detection of the corresponding voice signal, the absence of a detection output representing a mute interval of the corresponding voice signal on the respective communication line; and
    controlling means for controlling the attenuating means in response to the detection outputs of the detecting means such that:
        when the detecting means detects one of the transmitted and received voice signals during a mute interval of the other of the transmitted and received voice signals, the other of the transmitted and received voice signals is attenuated, and
        when the detecting means is currently detecting a transmitted voice signal and, further, newly detects a received voice signal following a mute interval of the received voice signal which is less than a predetermined time interval, preference is given to the newly detected, received voice signal in accordance with attenuating the currently detected, transmitted voice signal and delivering the newly detected, received voice signal to the speaker.

2. The voice switch as claimed in claim 1, wherein the predetermined time interval corresponds to a time required for a reverberation of an audio output of the speaker, in a mute voice signal interval following a received voice signal delivered thereto, to decrease to a level, when delivered from the microphone to the transmit communication line, which is not detected as a transmitted voice signal by the detecting means.

3. The voice switch as claimed in claim 1, wherein the predetermined time has a length corresponding to that of a mute interval that occurs prior to a pronunciation of a plosive consonant or an affricate in a human speech.

4. The voice switch as claimed in claim 1, wherein said predetermined time is a sum of a time required for a reverberation of an audio output of the audio speaker, in a mute voice signal interval following a received voice signal delivered thereto, to decrease to a level, when delivered from the microphone to the transmit communication line, which is not detected as a transmitted voice signal by the detecting means and a time interval of a length corresponding to a mute interval that occurs prior to pronunciation of a plosive consonant or an affricate in human speech.

5. The voice switch as claimed in claim 1, further comprising variable setting means for adjusting said predetermined time.

6. The voice switch as claimed in claim 1, wherein said detecting means further comprises:
    filter means for effecting respective predetermined filtering processes on a signal component of the received voice signal and on a signal component of the transmitted voice signal for the purpose of detecting the respective voice signals, each filtering process having a time constant, corresponding to a time interval in pronouncing a syllable in human speech, during which detection outputs of the detecting means are inhibited and the controlling means correspondingly does not control the attenuating means to change the currently selected and attenuated one of the transmitted and received voice signals.

7. The voice switch as claimed in claim 1, wherein said detecting means further comprises:
    first filter means for effecting a first filtering process on a signal component of the received voice signal and on a signal component of the transmitted voice signals for the purpose of detecting respective levels of the received and transmitted voice signals;
    second filter means for effecting a second filtering process on a signal component of a received voice signal and on a signal component of a transmitted voice signal for the purpose of detecting respective noise levels thereof, said second filtering process employing a decay time constant having a value corresponding to a reverberation time of an environment in which the hands-free communication system is housed; and
    comparing means for detecting the received and transmitted voice signals, respectively, on the basis of the received voice signal level and respective noise level and the basis of the transmitted voice level and respective noise level.

8. The voice switch as claimed in claim 1, wherein said detecting means, further, detects a transmitted voice signal on the transmit communication line by detecting a variation in an instantaneous amplitude of the transmitted voice signal.

9. The voice switch as claimed in claim 1, wherein said detecting means further comprises:
    first filter means for effecting a first filtering process, having a first time constant, on a signal component of a received voice signal for the purpose of detecting the received voice signal; and
    second filter means for effecting a second filtering process, having a second time constant, on a signal component of the transmitted voice signal for the purpose of detecting the transmitted voice signal, the second time constant being smaller than the first time constant of said first filtering process.

10. The voice switch as claimed in claim 1, wherein said controlling means, further, controls the attenuating means to maintain a most recently selected one of the transmitted and received voice signals when neither a received voice signal nor a transmitted voice signal is currently detected.

11. A voice switch, used in a hands-free communication system, comprising:
    attenuating means for attenuating a selected one of a transmitted voice signal, delivered from a microphone to a transmit communication line, and a received voice signal, received via a receive communication line and delivered to an audio output speaker;

detecting means for detecting a transmitted voice signal on the transmit communication line and a received voice signal on the receive communication line and for producing respective, transmitted and received voice signal detection outputs, each detection output being produced for the duration of detection of the corresponding voice signal, the absence of a detection output defining a mute interval of the corresponding voice signal on the respective communication line; and controlling means for controlling the attenuating means in response to the detection outputs of the detecting means such that:

when the detecting means detects one of the transmitted and received voice signals during a mute interval of the other of the transmitted and received voice signals, the other of the transmitted and received voice signals is attenuated, when the detecting means is currently detecting a transmitted voice signal and, further, newly detects a received voice signal following a mute interval of the received voice signal which is less than a first predetermined time interval, preference is given to the newly detected, received voice signal in accordance with attenuating the currently detected, transmitted voice signal and delivering the newly detected, received voice signal to the speaker, and when the detecting means is currently detecting a received voice signal and, further, newly detects a transmitted voice signal following a mute interval of the transmitted voice signal which is less than a second predetermined time interval, preference is given to the newly detected, transmitted voice signal in accordance with attenuating the currently detected, received voice signal and terminating delivery of the currently detected, received voice signal to the speaker.

12. The voice switch as claimed in claim 11, wherein the first predetermined time interval corresponds to a time required for a reverberation of an audio output of the speaker, in a mute voice signal interval following a received voice signal delivered thereto, to decrease to a level, when delivered from the microphone to the transmit communication line, which is not detected as a transmitted voice signal by the detecting means.

13. The voice switch as claimed in claim 11, wherein the first predetermined time has a length corresponding to that of a mute interval that occurs prior to a pronunciation of a plosive consonant or an affricate in a human speech.

14. A voice switch of a hands-free communication system having transmit and receive communication lines, a microphone responsive to an audio input for producing a corresponding transmitted voice signal on the transmit communication line and a speaker receiving a received voice signal on the receive communication line and producing a corresponding audio output, comprising:

transmit and receive voice signal attenuators respectively associated with the transmit and receive communication lines and selectively attenuating respective, transmitted and received voice signals thereon;

transmit and receive voice signal detectors respectively associated with, and detecting, a transmitted voice signal on the transmit communication line and a received voice signal on the received communication line and producing respective detection outputs, each detection output being produced for the duration of detection of the corresponding voice signal, the absence of a detection output representing a mute interval of the corresponding voice signal on the respective communication line; and a controller controlling the transmit and receive voice signal attenuators in response to the corresponding detection outputs of the respective transmit and receive voice signal detectors, such that:

when one of the detectors detects the corresponding voice signal during a mute interval of the other voice signal, the other of the corresponding voice signal attenuators is controlled to attenuate the other of the voice signals, and when the transmit voice signal detector is currently detecting a transmitted voice signal and, further, the receive voice signal detector newly detects a received voice signal following a mute interval of the received voice signal which is less than a predetermined time interval, preference is given to the newly detected, received voice signal in accordance with attenuating the currently detected, transmitted voice signal and delivering the newly detected, received voice signal to the speaker.

15. The voice switch as claimed in claim 14, wherein the predetermined time interval corresponds to a time required for a reverberation of an audio output of the speaker, in a mute voice signal interval following a received voice signal delivered thereto, to decrease to a level, when delivered from the microphone to the transmit communication line, which is not detected as a transmitted voice signal by the transmit voice signal detector.

16. The voice switch as claimed in claim 14, wherein the predetermined time has a length corresponding to that of a mute interval that occurs prior to a pronunciation of a plosive consonant or an affricate in human speech.

17. The voice switch as claimed in claim 14, wherein said predetermined time is a sum of a time required for a reverberation of an audio output of the speaker, in a mute voice signal interval following a received voice signal delivered thereto, to decrease to a level, when delivered from the microphone to the transmit communication line, which is not detected as a transmitted voice signal by the transmit voice signal detector and a time interval of a length corresponding to a mute interval that occurs prior to pronunciation of a plosive consonant or an affricate in human speech.

18. The voice switch as claimed in claim 14, wherein said each of the transmit and receive voice signal detectors further comprises:

a filter effecting a predetermined filtering process on a signal component of the corresponding voice signal for the purpose of detecting same, each filtering process having a time constant, corresponding to a time interval in producing a syllable in human speech, during which the detection output thereof is inhibited and the controller correspondingly does not control the associated voice signal attenuator to change from a current state of attenuation of the corresponding voice signal.

19. The voice switch as claimed in claim 14, wherein each of the voice signal detectors further comprises:

a first filter effecting a first filtering process on a signal component of the associated voice signal for detecting the corresponding level thereof;

a second filter effecting a second filtering process on a signal component of the associated voice signal for detecting a respective noise level thereof, the second filtering process employing a delay time constant having a value corresponding to a reverberation time of an environment in which the hands-free communication system is housed; and a comparator comparing and thereby detecting the corresponding voice signal on the basis of the respective, detected levels of the corresponding voice signal and respective noise level.

20. The voice which as claimed in claim 14, wherein each of the detectors, further, detects the associated voice signal on the respective communication line by detecting a variation in an instantaneous amplitude of the associated voice signal.

21. The which is claimed in claim 14, wherein:

the received voice signal detector further comprises a first filter effecting a first filtering processing, having a first time constant, on a signal component of a received voice signal for the purpose of detecting the received voice signal; and the transmit voice signal detector further comprises a second filter effecting a second filtering process, having a second time constant, on a signal component of the transmitted voice signal for the purpose of detecting the transmitted voice signal, the second time constant being smaller than the first time constant.

22. The voice switch as claimed in claim 14, wherein the controller, further, controls the transmit and receive voice signal attenuators so as to maintain the attenuation by the most recently selected one of the transmitted and received voice signals, when neither a received voice signal nor a transmitted voice signal is currently detected by the respective transmit and receive voice signal detectors.

23. A voice switch of a hands-free communication system having transmit and receive communication lines, a microphone responsive to an audio input for producing a corresponding transmitted voice signal on the transmit communication line and a speaker receiving a received voice signal on the receive communication line and producing a corresponding audio output, comprising:

transmit and receive voice signal attenuators respectively associated with the transmit and receive communication lines and selectively attenuating respective, transmitted and received voice signals thereon;

transmit and receive voice signal detectors respectively associated with, and detecting, a presence of a transmitted voice signal on the transmit communication line and a presence of a received voice signal on the received communication line and producing respective detection outputs, each detection output being produced for the duration of the detected presence of the corresponding voice signal, the absence of a detection output representing a mute interval of the corresponding voice signal on the respective communication line;

a controller controlling the transmit and receive voice signal attenuators in response to the corresponding detection outputs of the respective transmit and receive voice signal detectors such that:

when one of the detectors detects the corresponding voice signal during a mute interval of the other voice signal, the other of the corresponding voice signal attenuators is controlled to attenuate the other of the voice signals, when the transmit voice signal detector is currently detecting a transmitted voice signal and, further, the receive voice signal detector newly detects a received voice signal following a mute interval of the received voice signal which is less than a predetermined time interval, preference is given to the newly detected, received voice signal in accordance with attenuating the currently detected, transmitted voice signal and delivering the newly detected, received voice signal to the speaker, and when the receive voice signal detector is currently detecting a received voice signal and, further, the transmit voice signal detector newly detects a transmitted voice signal following a mute interval of the transmitted voice signal which is less than a second predetermined time interval, preference is given to the newly detected, transmitted voice signal in accordance with attenuating the currently detected, received voice signal and correspondingly terminating the delivery of the currently detected, received voice signal to the speaker.

24. The voice switch as claimed in claim 23, wherein the first predetermined time interval corresponds to a time required for a reverberation of an audio output of the speaker, in a mute voice signal interval following a received voice signal delivered thereto, to decrease to a level, when delivered from the microphone to the transmit communication line, which is not detected as a transmitted voice signal by the detecting means.

25. The voice switch as claimed in claim 23, wherein the first predetermined time has a length corresponding to that of a mute interval that occurs prior to a pronunciation of a plosive consonant or an affricate in a human speech.

* * * * *

UNITED STATES PATENT AND TRADEMARK OFFICE
CERTIFICATE OF CORRECTION

PATENT NO.:    5,940,499
DATED     :    August 17, 1999
INVENTOR(S):   Kensaku FUJII et al.

It is certified that error appears in the above-identified patent and that said Letters Patent is hereby corrected as shown below:

On the title page, [54] Title, after "IN" insert --A--.

Col. 1,     line 1, after "IN" insert --A--.

Col. 17,    line 9, change "which" to --switch--;
            line 14, change "which" to --switch--.

Signed and Sealed this

Eleventh Day of April, 2000

Attest:

Attesting Officer

Q. TODD DICKINSON
Director of Patents and Trademarks